Dec. 19, 1950  F. B. ALLEN  2,534,807
METHOD AND APPARATUS FOR HANDLING FINE SOLIDS
Filed March 19, 1945  3 Sheets-Sheet 3
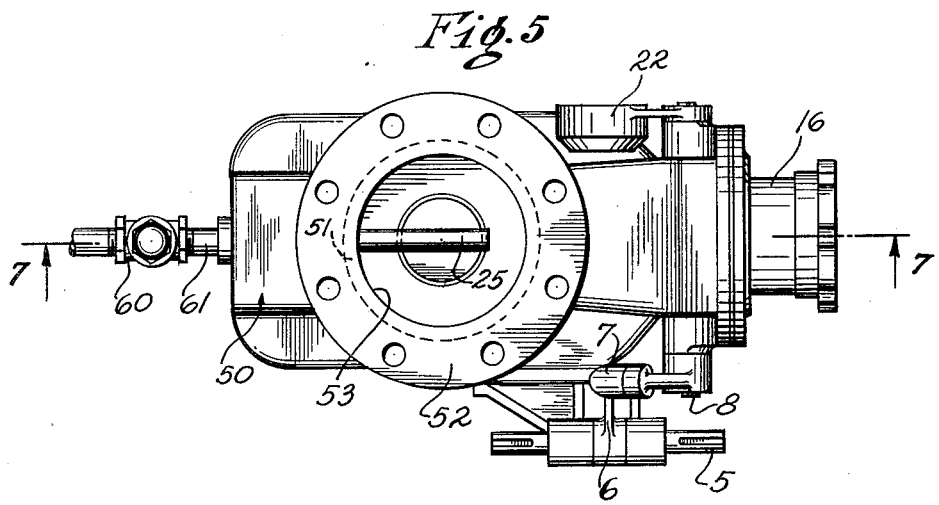
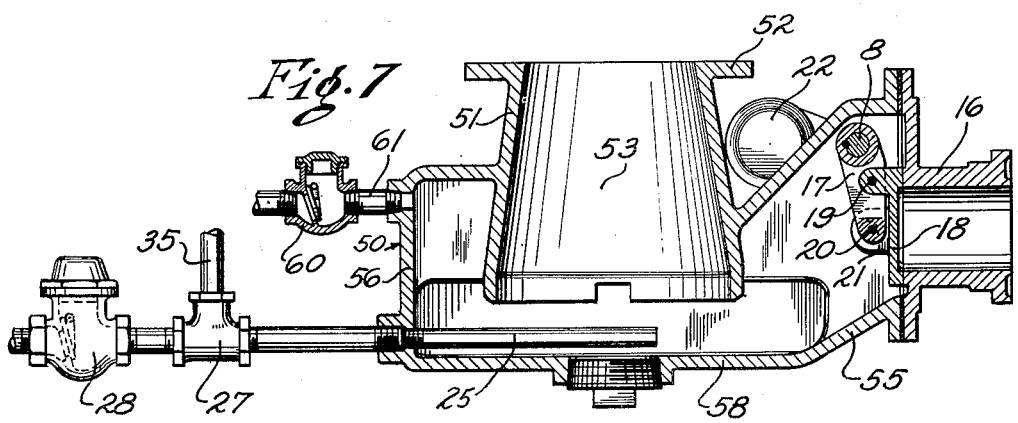
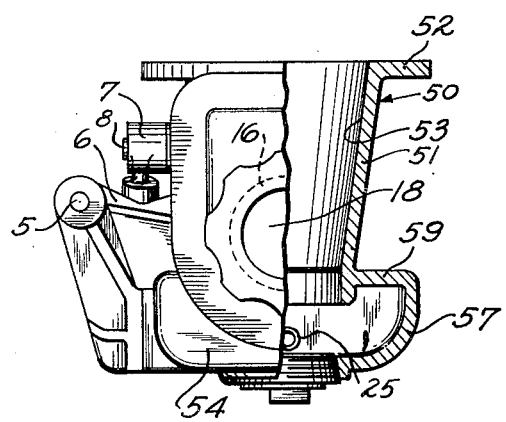
INVENTOR.
FRANK B. ALLEN
BY
Richey & Watts
ATTORNEYS Patented Dec. 19, 1950

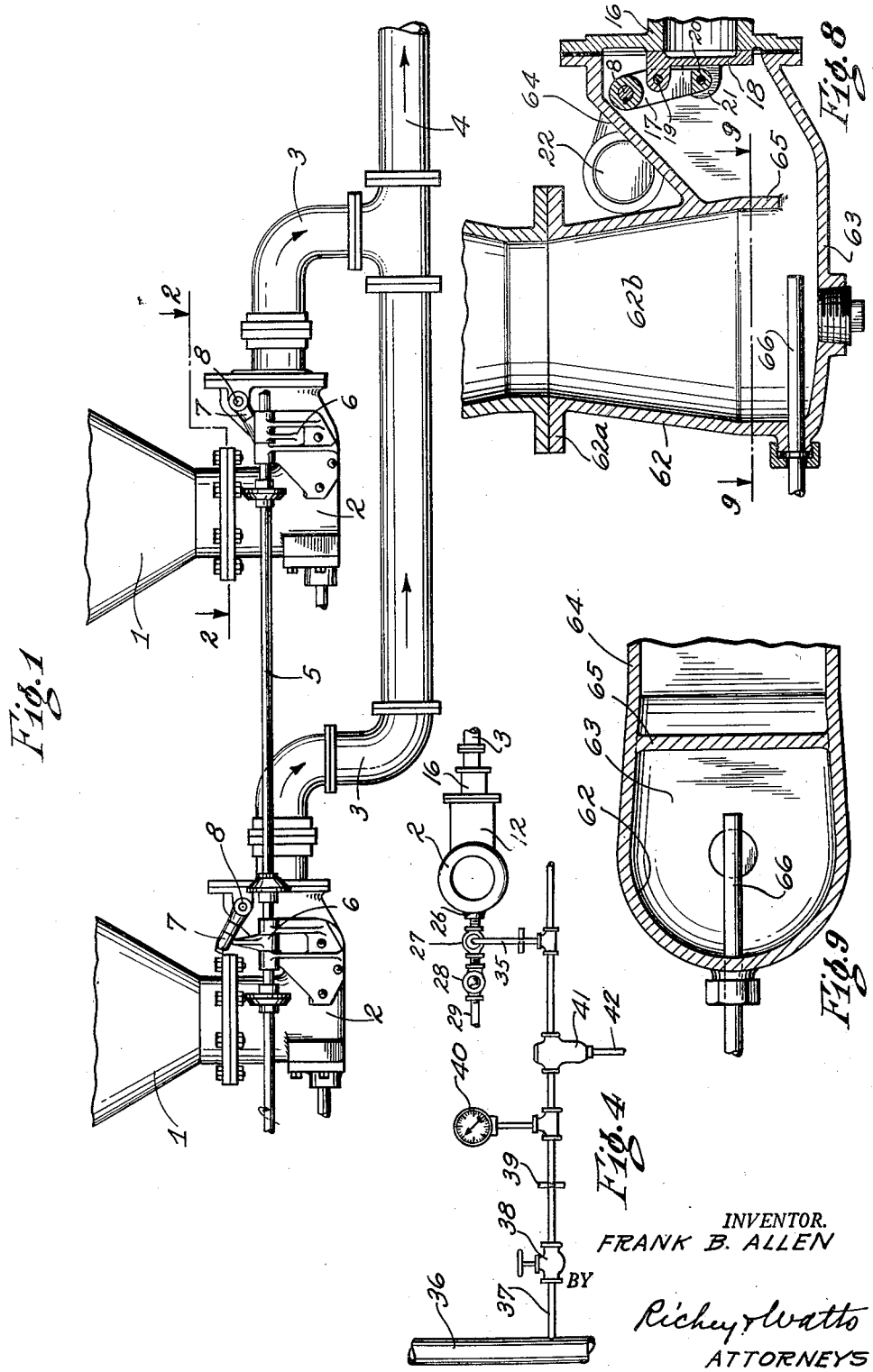

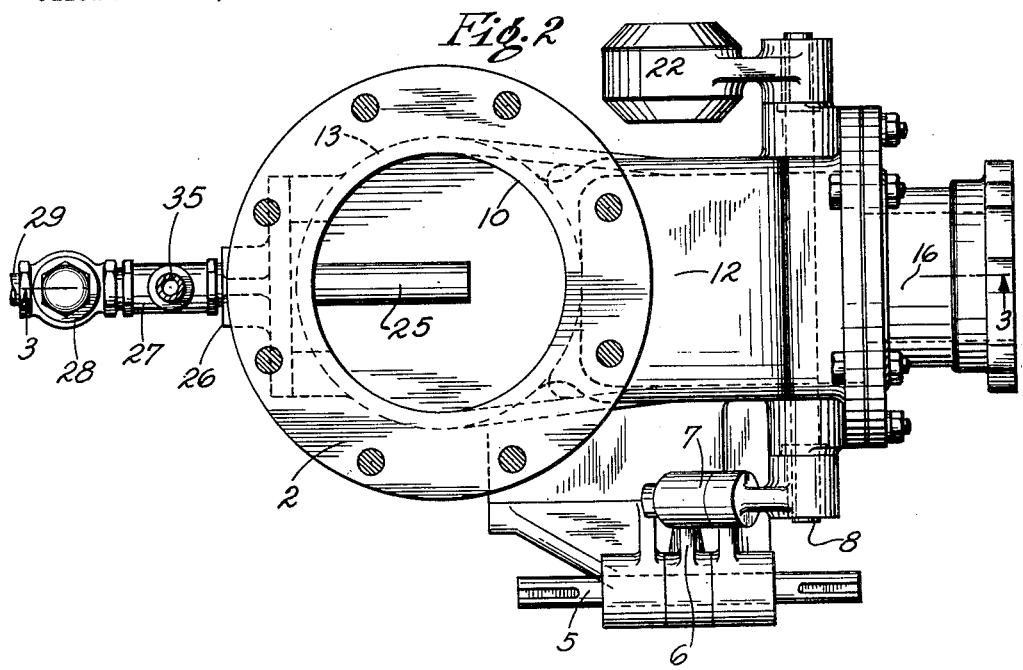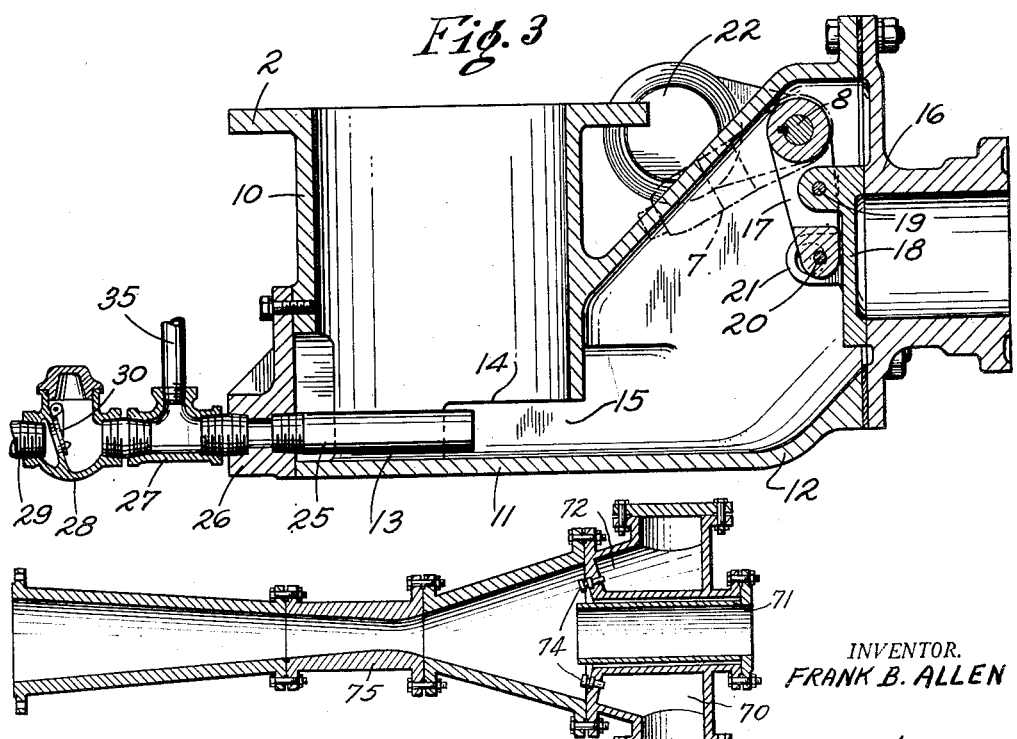

2,534,807

UNITED STATES PATENT OFFICE 2,534,807

METHOD AND APPARATUS FOR HANDLING FINE SOLIDS

Frank B. Allen, Lower Marion Township, Montgomery County, Pa., assignor to The Allen-Sherman-Hoff Company, Philadelphia, Pa., a corporation of Pennsylvania Application March 19, 1945, Serial No. 583,489

7 Claims. (Cl. 302—52)

This invention relates generally to the handling of solids and is particularly concerned with a new method of and new apparatus for removing fine solids from a collecting hopper.

Many efforts have been made over a considerable period of time to remove fine solids from collecting hoppers, particularly the fine ash which is precipitated out of the gases of large powdered fuel burning furnaces after the gases leave the combustion and heat transfer chambers and before the gases reach the stack. Much of this electrically precipitated ash is extremely fine, that is, much of it will pass thru a 300 mesh screen. Fine solids present a major material-handling problem, particularly when the solids are this fine ash of powdered fuel burning furnaces. This ash is collected in hoppers under slightly less than atmospheric pressure. A collected mass of this fine ash is quite compact and does not flow readily.

Mechanical means for removing the collected ash are quite unsatisfactory and, consequently, many efforts have been made to employ vacuum means for removing the mass of fine ash from the collecting hoppers and transporting it to a place of disposal or to a means of conditioning it for further handling but, so far as I am aware, none of these attempts has been entirely successful or satisfactory.

One effort, which is represented by apparatus which has been used commercially with some satisfaction, is disclosed in my U. S. Patent No. 1,943,780 which issued on January 16, 1934. In the apparatus of that patent the fine ash was collected in a hopper and in a valve therebeneath. The ash built up in the valve in a pile the sides of which were spaced apart from the sides of the valve. A rotatable member was provided with passages thru which, when the member was rotated to a predetermined position, air could be drawn thru the member and around the pile of solids in the valve and thence out thru a conduit under decreased pressure created by suction means communicating with the conduit. In this manner the air flowing around the solids in the valve picked up and carried with it some of the solids from the outer portions of the pile and in this way the solids were gradually removed from the hopper.

While the apparatus and method of Patent 1,943,780 has been more satisfactory in commercial use than any apparatus and method devised prior thereto, so far as I am aware, it possessed several disadvantages which the present invention avoids. Difficulties were experienced with the rotatable member. It was composed of ferrous metal which tended to rust due to the presence of moisture in the ash. Brass sleeves which were used to insure continued actuation of the rotatable member were easily cut by the small abrasive particles of ash thus impairing the bearing qualities of the sleeve and affording spaces thru which air and dust could be drawn continuously by the vacuum with resultant increase in the sizes of the spaces until the sleeve had to be replaced. Furthermore, if the rotating member was not turned to a fully closed position after being in an open position the vacuum would cause a constant flow of air and very fine ash thru the member and that flow being at high velocity would effectively and quickly "wire cut" and enlarge the initially small space and make it necessary to repair or replace the rotatable member or the valve, or both of these parts. Considerable personal attention was required to avoid these harmful actions and the attendant need for repairs or replacements.

While the rate of ash removal was high as compared with prior vacuum devices it was not as great as it theoretically should have been for the air in passing around the pile of ash in the valve did not entrain as much ash as it could carry at its velocity of travel. Variations in the vacuum applied caused only small variations in the velocity of air flowing thru the valve and in ash entrained therein.

By the present invention I have avoided these and other shortcomings of the prior art and have provided a new method and new apparatus for readily, expeditiously and efficiently removing fine solids from a collecting hopper.

In the drawings accompanying and forming a part of this specification,

Figure 1 is a side elevational view of portions of two hoppers and associated mechanism for removing fine solids therefrom;

Figure 2 is a plan view, partly in section, taken on line 2—2 of Fig. 1;

Figure 3 is a longitudinal, sectional view taken on line 3—3 of Fig. 2;

Figure 4 is a fragmentary, partly diagrammatic view showing apparatus for delivering gas at low pressure into solids collecting in the hopper of Fig. 1;

Figure 5 is a top plan view of a modified form of the valve shown in Figs. 1, 2 and 3;

Figure 6 is an end view, partly in elevation and partly in section of the valve of Fig. 5;

Figure 7 is a central, vertical, sectional view taken on line 7—7 of Fig. 5, certain parts being shown in elevation.

Figure 8 is a central, vertical, sectional view similar to Figs. 3 and 7 but showing a modified form of valve;

Figure 9 is a horizontal sectional view taken on line 9—9 of Fig. 8; and,

Figure 10 is a central, sectional view showing means for creating a vacuum in the apparatus of Figs. 1 to 9.

In Figs. 1 to 3, hoppers 1 are of the conventional type used for collecting fine solids, for example, the hoppers under electrical precipitators between the heat transfer chamber and the stack of a powdered fuel burning furnace. Each hopper 1 has a discharge opening in its lower portion which communicates with the interior of a valve structure designated as an entirety by numeral 2. The interior of each valve structure 2 may be placed in communication with a conduit 3 thru a valve or door-controlled outlet opening, the branch conduits 3 opening into a main conduit 4 in which a partial vacuum may be created by any suitable means, for example, the Hydrovactor shown and described in general form in U. S. Patent No. 1,943,780. One form of vacuum creating device is shown in some detail in Fig. 10. It comprises a fitting 70 which has an axial passage 71 of about the same size as that of conduit 4 and which is attachable to that conduit, and a surrounding chamber 72 communicating with conduit 73 and provided with nozzles 74 to discharge fluid under pressure delivered from conduit 73 convergingly past the discharge end of passage 71 and into conduit 75. When fluid, particularly in the form of a liquid, is discharged thru the nozzles, a strong suction action is created and fine material, gases and air, are thereby drawn thru conduit 4 and a partial vacuum is created in conduit 4, conduits 3 and any valve 2 which may be in open communication with any of the latter conduits.

A rotatable shaft 5 extends alongside of the bodies 2 and has cams 6 thereon positioned to engage lever arms 7 which are keyed to shafts 8 extending thru the valve structure 2 and carrying valves or doors for the outlet opening at the inlet ends of conduits 3. Any suitable means may be used to rotate shaft 5.

Referring more particularly to Figs. 2 and 3 in which details of the valve structure 2 are better shown, it will be seen that each valve structure 2 comprises a hollow body including a portion 10 which, as shown, is cylindrical and constitutes a passage extending from the discharge opening of the hopper 1 and opening into a body chamber formed by housing 11 which encloses the discharge end of body portion 10 and has an enlarged extension 12. Preferably, the body portion 10 extends to and is integral with the bottom wall of housing 11 thruout part of the circumferential length of body portion 10, as indicated at 13, while the remainder of the lower edge of body portion 10, as indicated at 14, is spaced from the bottom wall of the housing 11. In other words, a space or passage 15 is provided between the bottom wall of the housing 11 and the lower edge 14 of body portion 10 thruout approximately 180° of the circumferential length of the latter. This space 15 establishes communication between the hopper and is in communication with the chamber in extension 12 of the housing 11. The end of extension 12, remote from body portion 10, is closed by a fitting 16 which carries conduit 3.

The shaft 8 which extends thru extension 12 of the housing has an arm 17 keyed thereto within the housing. This arm is connected to a door or valve 18, for the outlet opening from the valve into the inlet end of the conduit 3, by a pivot pin 19 and a lost motion pin 20 which is movable in an enlarged opening of ear 21 integral with door 18. The shaft 8 has a counterweight 22 at the end opposite to lever 7.

It will be understood that when shaft 5 rotates and moves cam 6 upwardly and the latter lifts lever 7, shaft 8 will be rotated and will swing door or valve 18 away from its seated position, as shown in Fig. 3, and thereby place the interior of housing 11 in communication with the interior of conduit 3. It will also be understood that further rotation of shaft 5 will move cam 6 out of contact with lever arm 7, whereupon the counterweight will rotate shaft 8 in the opposite direction and bring the door or valve 18 into the seated position shown in Fig. 3.

Means are provided for admitting air or gas into the interior of housing 11. As shown, this means includes pipe 25 which has its inner end disposed approximately on the longitudinal center line of the passage thru body portion 10, and preferably in horizontal alignment with the space 15 between the lower edge of wall 14 of body portion 10 and the inner surface of the bottom wall of housing 11. The pipe 25 communicates thru a passage in block 26 constituting part of body portion 10 and housing 11 with a pipe T 27 and a valve 28 having an inlet tube 29 and a pivoted closure 30.

A pipe 35 connects the T 27 with a main pipe line 36 (Fig. 4) thru a connected system of lines and valves. The line 36 may carry gas or air at a pressure of, for example, 100 pounds per sq. in. From line 36 a branch line 37 which may, for example, be about ½ inch in inside diameter, leads to a control valve 38, thence thru a restriction 39 which has an opening for example about ⅛" in diameter, where the pressure of the main line 36 is greatly reduced, for example, to about 5 pounds per sq. in. Thence the line 37 leads to a pressure indicating gage 40 and to a water separator 41 from which water collected therein may be removed thru line 42. Most of the moisture in the gas or air which enters line 37 is removed when the pressure is reduced by valve 38 and restriction 39 and collects in collector 41. The thus dried gas or air passes into line 35, thru another restriction 43 similar to restriction 39, and the low pressure gas enters line 35 and can flow continuously thru tube 25 and rise thru solids in the passage in body portion 10 and enter solids in the hopper 1 thereabove. Under the dimensional conditions above set forth, the inlet tube 29 may be about ¾" in diameter and the pipe 25 may be about 1" in inside diameter.

The operation of the above described apparatus in carrying out the present method will be understood by those skilled in the art from the following description: When fine solids are being collected and are building up in a mass from the lower wall of housing 11 thru body portion 10 and into hopper 1, and control valve 38 is open, gas or air under about 5 pounds pressure per sq. in. will flow constantly thru the tube 25 and into the mass of fine solids in body portion 10 and up thru the solids in hopper 1 due to that pressure and the partial vacuum induced by the stack draft. This continual flow of gas or air thru the collecting mass of solids prevents the solids from compacting and maintains them in a readily flowable condition due to the presence of gas therein. When a sufficiently large mass of solids has been collected in the hopper 1, and those solids are to be removed, suction is applied to the conduit 4 thereby creating a condition of subatmospheric pressure or partial vacuum in that conduit and in branch conduits 3. When the pressure within these conduits is reduced to the desired or to a predetermined amount, shaft 5 is rotated to lift lever arm 7 of one valve and thereby swing the door 18 away from its seat against fitting 16 and place the interior of that housing 11 in communication with the interior of the associated branch conduit 3. Thereupon the pressure within housing 11 outside of the solids is reduced to that existing in the branch conduit 3. When the difference in pressure between that within the housing 11 and that outside of the housing, which is preferably atmospheric pressure, is raised to the extent necessary to cause the closure 30 to leave its seat, air or gas will flow thru the tubes 29, 25 and the intermediate members and into the lower part of the solids in the housing around the open end of pipe 25. This incoming air or gas flows thru the lower portion of the mass of solids in the housing and out thru space or passage 15 into extension 12 and into and thru conduits 3 and 4. By reason of the delivery of gas or air at some pressure and velocity within the mass of solids, and the flow of that gas or air thru part of the mass of solids, the flowing gas or air entrains a large amount of solids and carries them with it thru the conduits 3 and 4. Since the mass of solids is free flowing by reason of the gas or air mixed therewith, the solids in the hopper and in body portion 10 readily flow down to replace solids covering the outlet end of pipe 25 as fast as solids are removed from the lower part of the mass and, as a result, the emptying of the hopper is accomplished expeditiously with high efficiency, i. e., the air or gas flowing out thru extension 12 and conduits 3 and 4 carries with it nearly, if not quite, the maximum amount of solids which gases of that volume and traveling at that velocity could theoretically entrain and transport. The pressure differential is maintained until substantially all the solids are removed from the hopper and valve but is not maintained thereafter, for when gases can flow from the hopper into the housing the pressure in the housing will rise and closure 30 will be closed by gravity.

Closure 30 has two main purposes. It prevents dust from being blown out, as for example when a large volume of dust is suddenly discharged into the valve body. Whenever the precipitator vibrators are actuated dust is dislodged from the precipitator and falls in large volume down into the valve body and would blow out of the valve body thru pipe 29 if it were not for the presence of the closure 30. This closure also permits air to flow into the valve body when a condition of vacuum is created therein. This closure is so constructed that it opens on a small pressure differential and, therefore, opens as soon as door or valve 18 is opened to connect the interior of the valve body with pipe 16 in which a condition of vacuum exists, and remains open as long as door 18 is open.

Since the concentration of solids in the gases flowing out of valve body 2 into pipe 16 is determined by the size of gas inlet pipe 25, it will be understood that by varying the size of that pipe the concentration of solids in the outgoing gases may be varied.

When the collected solids have been thus removed from one hopper further rotation of shaft 5 will move cam 6 out of contact with lever arm 7, whereupon door 18 returns to its seat on fitting 16, thereby breaking the communication between the interior of branch conduit 3 and extension 12 of the housing, and further rotation of the shaft will open the door of the next hopper, whereupon the foregoing sequence of operations takes place.

It will be understood that certain fine solids may flow freely even when not supplied with air or gas as above described. Consequently when such solids are being handled by the present method and apparatus the line 35 and its connections to the main line 36 may be omitted.

The modified form of valve structure shown in Figs. 5, 6 and 7 in general resembles valve structure 2 of Figs. 1, 2 and 3. However, the differences will be evident from the drawing and the following description:

The valve structure 50 of Figs. 5, 6 and 7 comprises a hollow body 51 which has an outwardly extending flange 52 at its upper end for attachment to a hopper and defines a passage 53 leading from the hopper into housing 54 which has an enlarged end 55 to communicate with fitting 16 which may be connected to conduit 3. Housing 54 has an enlarged extension 56 opposite extension 55 and has enlarged side extensions 57 connecting the spaces within extensions 55 and 56. Body 51 is substantially cylindrical at its upper end but is laterally flattened at its lower end so that it is wider at its lower end in a direction lengthwise of the housing than it is in the direction transversely of the housing. The lower end of body 51 preferably terminates some little distance above the inner surface of the bottom wall 58 of the housing and a short distance below the inner surface of the horizontal walls 59 which constitute parts of extensions 57. A gas inlet valve 60, substantially like valve 28, is connected to valve 50 by nipple 61.

It will be understood from the foregoing description, taken in conjunction with Figs. 5, 6 and 7 that the lower end of body 51 opens into the housing between the side extensions 57 and the end extensions 55 and 56, and that when finely divided solids pass from the hopper into valve structure 50 they will spread out on the top surface of bottom 58 and will build up in passage 53, but that open spaces will connect the interiors of end extensions 55 and 56 thru extensions 57 outside of such an accumulated pile of solids.

As in Figures 1, 2 and 3, the valve structure of Figs. 5, 6 and 7 is provided with a valve or door 18 to make or break the communication between the interiors of fitting 16 and extension 55; and this door is connected to shaft 8 by arm 17, pivot pin 19 and lost motion pin 20; and the shaft 8 carries a counterweight 22 at one end and a cam lever 7 at the other end to engage cam 6 on shaft 5. Also, pipe line 13 extends from a discharge end disposed near the vertical center of body 51 thru the wall of the housing 50 and joins a T 27 to one branch of which is connected inlet pipe 35 and to another branch of which a valve 28 is connected.

The operation of apparatus of Figs. 5, 6 and 7 is much like that of Figs. 1 to 4 as described hereinabove. When solids which have accumulated in valve structure 50 and in a hopper thereabove are to be removed, a condition of vacuum is created in conduit 3 and fitting 16. Then rotation of shaft 5 causes cam 6 to actuate lever 7 and thereby to move door 18 away from its seat on fitting 16 and place the interior of that fitting in communication with the interior of valve structure 50. When the vacuum is sufficiently high in valve 50, valves 28 and 60 open due to the difference in pressure on opposite sides thereof, whereupon air flows thru pipes 13 and 61 and enters the interior of the valve body. The air flow thru pipe 13 is delivered into the solids below inlet passage 53 and flows thru those solids and into and thru fitting 16, carrying some of the solids entrained with it. At the same time, air flowing thru pipe 61 passes along opposite sides of solids at the lower end of passage 53 and entrains some of the solids with which it so contacts and carries them into and thru fitting 16. In this manner solids are entrained both by the air flowing thru the pile of solids and also along the outer sides of that pile.

The valve structure shown in Figs. 8 and 9 is quite like the structures of Figs. 3 and 7. However, in this modification of the invention the hollow body 62 is provided with a flange 62a at its upper end for attachment to a hopper, and includes a passage 62b extending from the discharge opening of the hopper. Body 62 has a bottom wall 63 and an enlarged extension 64 at one side thereof. A cross wall 65 depends between passage 62b and the interior of extension 64 and provides a communicating passage therebeneath and opposite to the outlet end of fluid pipe 66. Extension 64 is provided with a door 18 and mountings therefor substantially as shown in Figs. 3 and 7 and described hereinabove, and pipe 16 is fitted to extension 64 also as described hereinabove. It will be understood that pipe 66 will be provided with parts 27, 28, 29, 30 and 35 of Fig. 3, or parts 27, 28 and 35 of Fig. 7, or equivalents thereof.

The operation of the apparatus of Figs. 8 and 9 is substantially the same as that which has been described hereinabove in connection with Figs. 3 and 7.

Having thus described my invention so that others skilled in the art may be able to understand and practice the same, I state that what I desire to secure by Letters Patent is defined in what is claimed.

What is claimed is:

1. The method of handling fine solids which comprises the steps of continuously collecting fine solids in a pile in a chamber in which a small vacuum exists, aerating and fluidizing said solids by introducing substantially dry gas under a low positive pressure into the interior of the pile, periodically connecting a space in said chamber outside of said pile of fluidized fine solids with a conduit in which a greater vacuum exists, and utilizing the resultant increased pressure differential which exists across said pile to induce a flow of gas through said pile of fluidized solids and entrain and carry such solids into said conduit.

2. Apparatus for removing solids from a collecting hopper comprising a body having a chamber therein and having a wall extending into said chamber and defining a passage connecting the interior of said chamber with the interior of the hopper, an extension near the outlet end of said passage, a conduit connected to said extension, a valve to close said conduit, a pipe extending thru the wall of the body and terminating beneath said passage, a controllable inlet closure for said pipe, means for connecting a source of substantially dry, low pressure gas to said pipe between its closure and its outlet end, and means associated with said conduit for creating a condition of partial vacuum in said body.

3. Apparatus for removing solids from a collecting hopper comprising a body having a chamber therein and having a wall extending into said chamber and defining a passage connecting the interior of said chamber with the interior of the hopper, a housing enclosing the outlet end of said passage and spaced apart from the lower edge of said wall for part of the circumferential length of said wall, a conduit leading from said housing, a valve to close said conduit, a pipe extending thru the wall of the housing and terminating beneath the outlet end of said passage, a controllable closure for said pipe, means for connecting a source of substantially dry, low pressure gas to said pipe between its closure and its outlet end, and means associated with said conduit for creating a condition of partial vacuum in the housing and conduit.

4. Apparatus for removing solids from a collecting hopper comprising a body having a chamber therein and having a wall extending into said chamber and defining a passage connecting the interior of said chamber with the interior of the hopper, a housing enclosing the outlet end of said passage and having its bottom portion spaced apart from the lower edge of said wall for part of the circumferential length of said wall, a conduit leading from said housing, a valve to close said conduit, a pipe extending thru the wall of the housing and terminating beneath the outlet end of said passage, said space below the edge of said first named wall lying between the conduit valve and the outlet end of said pipe, a closure for said pipe actuable to open position by exterior pressure when a partial vacuum is created within said housing, means for connecting a source of substantially dry, low pressure gas to said pipe between its closure and its outlet end, and means associated with said conduit for creating a condition of partial vacuum in the conduit and housing.

5. Apparatus for removing solids from a collecting hopper comprising a body having a chamber therein and having a wall extending into said chamber and defining a passage connecting the interior of said chamber with the interior of the hopper, a housing enclosing the outlet end of said passage, a conduit leading from said housing, a pipe extending thru the wall of the housing and having a gas-pressure-controlled inlet and an outlet disposed beneath the outlet end of said passage, means for connecting a source of substantially dry, low pressure gas to said pipe between its inlet and its outlet, and means for creating a vacuum induced flow of gas thru said pipe and out of said housing into said conduit.

6. Apparatus for removing solids from a collecting hopper comprising a body having a chamber therein and having a wall extending into said chamber and defining a passage connecting the interior of said chamber with the interior of the hopper, a housing enclosing the outlet end of said passage, a conduit leading from said housing, a valve in the housing to close said conduit, a pipe extending thru the wall of the housing and terminating beneath the outlet end of said passage, a gas-pressure-controlled closure for said pipe, means for connecting a source of substantially dry, low pressure gas to said pipe between its closure and its outlet end, means associated with said conduit for creating a condition of partial vacuum therein, and means associated with said valve to move it to open position.

7. Apparatus for removing solids from a collecting hopper comprising a body having a chamber therein and having a wall extending into said chamber and defining a passage connecting the interior of said chamber with the interior of the hopper, a housing enclosing the outlet end of said passage, a conduit leading from said housing, a valve in the housing to close said conduit, a pipe extending thru the wall of the housing and terminating beneath the outlet end of said passage, a gas-pressure-controlled closure for said pipe, means for connecting a source of substantially dry, low pressure gas to said pipe between its closure and its outlet end, means associated with said conduit for creating a condition of partial vacuum therein, and means associated with said valve to move it to open position.

FRANK B. ALLEN.

REFERENCES CITED

The following references are of record in the file of this patent:

UNITED STATES PATENTS

| Number | Name | Date |
|---|---|---|
| 285,047 | Lewis | Sept. 18, 1883 |
| 682,150 | Nichols | Sept. 3, 1901 |
| 738,172 | Edwards | Sept. 8, 1903 |
| 747,396 | Farnham | Dec. 22, 1903 |
| 1,473,757 | Dorsey | Nov. 13, 1923 |
| 1,566,517 | Bergman | Dec. 22, 1925 |
| 1,852,535 | Moore | Apr. 5, 1932 |
| 1,892,920 | Weiss | Jan. 3, 1933 |
| 1,896,597 | Smith | Feb. 7, 1933 |
| 1,943,780 | Allen | Jan. 16, 1934 |
| 1,970,405 | Thomas | Aug. 14, 1934 |
| 2,027,697 | Nielsen | Jan. 14, 1936 |
| 2,123,537 | Marr | July 12, 1938 |
| 2,303,810 | Anderson et al. | Dec. 1, 1942 |
| 2,368,396 | Allen | Jan. 30, 1945 |

FOREIGN PATENTS

| Number | Country | Date |
|---|---|---|
| 30,908 | France | July 6, 1926 |